United States Patent [19]

Cassar

[11] 4,190,460
[45] Feb. 26, 1980

[54] SULFUR PLASTICIZATION WITH OLEFINS

[75] Inventor: Richard D. Cassar, West Chester, Pa.

[73] Assignee: Suntech, Inc., Philadelphia, Pa.

[21] Appl. No.: 892,815

[22] Filed: Apr. 3, 1978

[51] Int. Cl.$^2$ ............................................. C09K 3/00
[52] U.S. Cl. ................................. 106/287.32; 260/139
[58] Field of Search ................. 106/287.32; 260/139, 260/666 A, 666 B, 666 PY; 252/45; 528/389

[56] References Cited

U.S. PATENT DOCUMENTS

| | | | |
|---|---|---|---|
| 2,757,075 | 7/1956 | Haimsohn | 423/567 |
| 2,787,613 | 4/1957 | Fields | 260/139 |
| 3,211,709 | 10/1965 | Ademek | 260/80.7 |
| 3,371,072 | 2/1968 | Signouret | 260/79 |
| 3,498,915 | 3/1970 | Coleman | 252/45 |
| 3,998,897 | 12/1976 | Kovach et al. | 260/666 A |
| 4,022,626 | 5/1977 | McBee | 109/287.32 |
| 4,147,640 | 4/1979 | Jayne | 260/139 |

*Primary Examiner*—Theodore Morris
*Attorney, Agent, or Firm*—J. Edward Hess; Donald R. Johnson; Paul Lipsitz

[57] ABSTRACT

A process for plasticizing sulfur to obtain a flexible, elastomeric product by reacting a mixture of dicyclopentadiene and a second cyclic diene or a di- or triolefinic terpene with sulfur.

14 Claims, No Drawings

SULFUR PLASTICIZATION WITH OLEFINS

It is well known in the art that sulfur reacts with olefinic compounds and such reaction is the basis for the vulcanization of rubber. In U.S. Pat. No. 3,211,709 there is disclosed the vulcanization with sulfur of a copolymer made by catalytically reacting an aliphatic monoolefin and an unsaturated bridge-ring hydrocarbon containing at least two double bonds. The products thus obtained are conventionally compounded to give rubber-like materials.

It is also known that diolefins will plasticize sulfur to give a fairly rigid, resinous, noncrystalline product. Diolefins and triolefins known to effect such plasticization include dicyclopentadiene, myrcene, alloocimene, limonene and dipentene. Some diolefins will not react with the molten sulfur or the degree of reaction is so small that there is essentially no apparent change in the sulfur properties. In some cases compounds that might normally react give no discernible product due to being too volatile to stay in contact with the sulfur under the conditions used for reaction. As indicated, where reaction does occur the product is a rigid, noncrystalline product and because of such properties the utility of the composition is limited.

The plasticization of sulfur with mixtures is also known. For example, U.S. Pat. No. 3,459,717 discloses the use of at least one ethylenic hydrocarbon together with a phosphorus containing diester to react with molten sulfur. Also, Polish Pat. No. 83,123 is reported by Chemical Abstracts (C.A. 86:75381, 1977) to disclose plasticization of sulfur with a solution of an aromatic olefin such as styrene in a paraffin oil, polyethylene wax, benzene or xylene.

It has now been found that reaction of certain di- or triolefins with sulfur may be achieved to obtain a flexible product which is thereby of greater utility. Thus, the flexible plasticized sulfur compositions of the invention may be used in formulations for road surfaces and road markings (e.g. paint striping), in adhesive and caulking formulations to impart flexiblity, and the like. In accord with the invention sulfur is reacted at elevated temperature with a mixture of dicyclopentadiene with a diene or triene which may be a bridge-ring hydrocarbon, a cyclic or acyclic di- or triolefin terpene, or a hydrocarbon where a cyclic olefin is fused to an aromatic ring.

To prepare the compositions it is merely necessary to mix the dicyclopentadiene and the other diene or triene and add the mixture with stirring or other agitation to molten sulfur generally at a temperature of from about 115° C. to about 160° C. Preferably, the temperature will be at the higher end of this range; i.e., about 150° to about 160° C. As the mixture is added a reaction is seen to occur by the rapid darkening of the sulfur mass and by an increase in the viscosity of the mixture. On cooling the product it is observed to be flexible and elastomeric. Thus, it can be bent or pulled with the plastic returning to its original shape. This elastomeric property is unexpected in view of the nature of the product obtained when the diene or triene components are separately reacted with sulfur. Thus, when dicyclopentadiene alone is reacted with sulfur in the manner described, the result is a dark, hard, glassy solid. If a diolefin alone, such as norbornadiene, is reacted with sulfur, the product appears essentially unreactive and the sulfur simply recrystallizes on cooling.

The diene or triene which is mixed with the dicyclopentadiene will be, as indicated, (1) an unsaturated bridge-ring hydrocarbon containing at least two double bonds, (2) a cyclic or acyclic di- or triolefinic terpene, or (3) a hydrocarbon where a cyclic olefin is fused to an aromatic ring. The unsaturated bridge-ring hydrocarbons are typified by:

(a) unsaturated derivatives of bicyclo[2.2.1]heptane containing at least two double bonds, including bicyclo[2.2.1]-hepta-2,5-diene (norbornadiene);
(b) unsaturated derivatives of bicyclo[2.2.2]octane containing at least two double bonds including bicyclo[2.2.2]-octa-2,5-diene;
(c) unsaturated derivatives of bicyclo[3.2.1.]octane containing at least two double bonds;
(d) unsaturated derivatives of bicyclo[3.3.1]nonane containing at least two double bonds; and
(e) unsaturated derivatives of bicyclo[3.2.2]nonane containing at least two double bonds.

The cyclic or acyclic di- and triolefinic terpenes are exemplified by dipentene, ψ-limonene, 3,8-p-menthadiene, α- and β-phellandiene, α- and γ-terpinene, terpinolene, isoterpinolene, myrcene, ocimene, alloocimene, p-cymene, α- and β-caryophyllene and the like. It will be understood that isomer mixtures may be present in the use of these terpenes, particularly when naturally derived terpenes are used. Preferred terpenes include the limonenes, allocimene and myrcene.

The hydrocarbon which has a cyclic olefin fused to an aromatic ring may be exemplified by indene, acenaphthalene, azulene, and the like. It will be understood that such compounds are cyclic diolefins by virtue of the fused cyclic olefin sharing a second double bond with the aromatic ring, although it will be further understood that the double bond of the aromatic ring is not fixed due to resonance.

The preferred compound to be mixed with dicyclopentadiene is bicyclo[2.2.1]hepta-2,5-diene (norbornadiene). The amount of the two dienes or trienes which are mixed for reaction with sulfur is preferably about equal parts by weight, but may vary from a weight ratio of from about 25:75 to about 75:25. The amount of the mixture to be added to the sulfur will generally be from about 10% to about 50% by weight of the sulfur used. Preferably about 20% to 40% of the mixture will be used.

In order the further describe the invention, the following examples are given:

EXAMPLE 1

A mixture of 2.5 g. of dicyclopentadiene and 2.5 g. norbornadiene is added with stirring to 20 g. of molten sulfur at 160° C. The added materials dissolve readily in the sulfur and a reaction occurs as determined by rapid darkening of the sulfur with increased viscosity of the mixture. On cooling the material is flexible in that it can be bent and pulled with the elastomer-like material returning to its original shape.

When 5.0 g. of dicyclopentadiene is used alone without the norbornadiene in the above examples the resulting product is a dark, hard, glossy solid.

When 5.0 g. of norbornadiene is used alone without the dicyclopentadiene, the product is orange and the sulfur recrystallizes indicating little reaction occurring.

EXAMPLE 2

A mixture of 2.5 g. of dicyclopentadiene and 2.5 g. of indene is added to molten sulfur as in Example 1. The reaction product is a black, somewhat foamed mass showing some flexiblity.

When the indene is used without the dicyclopoentadiene, the product is a hard, dark brown solid.

EXAMPLE 3

When Example 1 is repeated, but the norbornadiene replaced with d,l-limonene, a plasticized sulfur composition is obtained similar to that described in Example 1.

The invention claimed is:

1. A process for plasticizing sulfur to obtain a flexible, elastomeric material which consists essentially of adding to sulfur with thorough mixing at a temperature of from about 115° to about 160° C. from about 10% to about 50% by weight of said sulfur a mixture of dicyclopentadiene and an olefinic material selected from the group of (1) an unsaturated bridge-ring hydrocarbon containing at least two double bonds, (2) a cyclic or acyclic di- or triolefinic terpene, and (3) a hydrocarbon where a cyclic diene is fused to an aromatic ring, wherein said bridge-ring hydrocarbon is selected from the group consisting of:
   (a) unsaturated derivatives of bicyclo[2.2.1]heptane, contaning at least two double bonds,
   (b) unsaturated derivatives of bicyclo[2.2.2]octane containing at least two double bonds,
   (c) unsaturated derivatives of bicyclo[3.2.1.]octane containing at least two double bonds,
   (d) unsaturated derivatives of bicyclo[3.3.1]nonane containing at least two double bonds, and
   (e) unsaturated derivatives of bicyclo[3.2.2]nonane containing at least two double bonds;
   wherein said cyclic or acyclic di- or triolefin terpene is selected from the group consisting of: dipentene, $\psi$-limonene, 3,8-p-menthadiene, $\alpha$- and $\beta$-phellandiene, $\alpha$- and $\gamma$-terpinene, terpinolene, isoterpinolene, myrcene, ocimene, alloocimene, p-cymene, $\alpha$- and $\beta$-caryophyllene,
   wherein said hydrocarbon with a cyclic diene fused to an aromatic ring is selected from the group consisting of indene, acenaphthalene and azulene, and wherein the weight ratio of said dicyclopentadiene to said olefinic material is from about 25:75 to about 75:25.

2. The process of claim 1 wherein the olefinic material is a bridge-ring hydrocarbon.

3. The process of claim 2 where the hydrocarbon is norbornadiene.

4. The process of claim 1 where the olefinic material is a hydrocarbon having a cyclic olefin fused to an aromatic ring.

5. The process of claim 4 wherein the cyclic diolefin is indene.

6. The process of claim 1 where the olefinic material is a cyclic or acyclic di- or triolefinic terpene.

7. The process of claim 6 where the terpene is limionene.

8. The process of claim 6 where the terpene is alloocimene.

9. The process of claim 6 where the terpene is myrcene.

10. A flexible, plasticized sulfur composition obtained by adding with agitation a mixture of dicyclopentadiene and an olefinic material to molten sulfur held at a temperature of from about 115° to about 160° C., the weight ratio of the mixture of dicyclopentadiene to olefinic material being from about 25:75 to about 75:25, the amount of said mixture being added to said sulfur being from about 10% to about 50% by weight of said sulfur, and said olefinic material being selected from the group of (1) an unsaturated bridge-ring hydrocarbon containing at least two double bonds, (2) a cyclic or acyclic di- or triolefinic terpene, and (3) a hydrocarbon where a cyclic diene is fused to an aromatic ring, wherein said bridge-ring hydrocarbon is seleced from the group consisting of:
   (a) unsaturated derivatives of bicyclo[2.2.1]heptane, containing at least two double bonds,
   (b) unsaturated derivatives of bicyclo[2.2.2]octane containing at least two double bonds,
   (c) unsaturated derivatives of bicyclo[3.2.1.]octane containing at least two double bonds,
   (d) unsaturated derivatives of bicyclo[3.3.1]nonane containing at least two double bonds, and
   (e) unsaturated derivatives of bicyclo[3.2.2]nonane containing at least two double bonds;
   wherein said cyclic or acyclic di- or triolefinic terpene is selected from the group consisting of: dipentene, -limonene, 3,8-p-menthadiene, $\alpha$- and $\beta$-phellandiene, $\alpha$- and $\gamma$-terpinene, terpinolene, isoterpinolene, myrcene, ocimene, alloocimene, p-cymene, $\alpha$- and $\beta$-caryophyllene and
   wherein said hydrocarbon with a cyclic diene fused to an aromatic ring is selected from the group consisting of indene, acenaphthalene and azulene.

11. The sulfur composition of claim 10 obtained by adding a mixture of dicyclopentadiene and norbornadiene to sulfur.

12. The sulfur composition of claim 10 obtained by adding a mixture of dicyclopentadiene and indene to sulfur.

13. The sulfur composition of claim 10 obtained by adding a mixture of dicyclopentadiene and limonene to sulfur.

14. The sulfur composition of claim 10 obtained by adding a mixture of dicyclopentadiene and myrcene to sulfur.